Feb. 22, 1966   D. R. TREFFEISEN   3,237,012
PHOTOSENSITIVE DIGITALLY ENCODED INDICATOR FOR
USE WITH MECHANICAL MOVEMENTS
Filed May 21, 1962   2 Sheets-Sheet 1

INVENTOR.
DONAL R. TREFFEISEN

INVENTOR.
DONAL R. TREFFEISEN
BY
S.C. Yeaton
ATTORNEY

United States Patent Office 3,237,012
Patented Feb. 22, 1966

3,237,012
PHOTOSENSITIVE DIGITALLY ENCODED
INDICATOR FOR USE WITH MECHANICAL
MOVEMENTS
Donal R. Treffeisen, Huntington Station, N.Y., assignor to Sperry Rand Corporation, Great Neck, N.Y., a corporation of Delaware
Filed May 21, 1962, Ser. No. 196,297
9 Claims. (Cl. 250—219)

This invention relates to digital encoders and more particularly it concerns apparatus for digitally representing the position of a movable element.

In many control system applications it becomes desirable to represent the magnitude of a measured quantity in both analog and digital fashion. Aircraft flight control systems are one example of where such dual representation is required. The instruments which monitor various flight conditions such as altitude, heading and airspeed, generally operate in analog fashion to move an indicator needle for visual readout. This same information must also be available in digital form for use in the navigational and flight computers in the aircraft. Therefore some means must be available for detecting indicator needle movements and for producing digital signals which represent such movements.

One well known technique for obtaining digital information from a mechanical movement, such as shaft rotation, has been through the provision of a coded wheel or disc having alternately conductive and nonconductive segments arranged along a plurality of parallel tracks according to a binary system; and a series of electrical brushes assigned to individual tracks along the coded wheel. Either the wheel or the series of brushes may move in response to the indicator movements while the other remains stationary. Encoding devices which operate according to these principles suffer from the standpoint of their inherently high frictional characteristics which leads to error, wear and inaccuracy.

To a certain extent these frictional difficulties are obviated in encoding devices which make use of magnetic or photo-electric sensing means in which no physical contact is made between the relatively rotating elements. However, in all such devices, either a coded wheel, a series of sensing elements or an energy source must be rotated by the object whose position is being sensed. These elements generally possess a relatively high inertia which decreases the response of the sensing and driving means, and thus introduce dynamic errors into the system.

Furthermore, in a great many of these devices it is possible to have an undetected failure in a certain part of the digital encoding means which would give no indication other than a highly erroneous reading. It would be preferable to have the entire encoder fail in case of any such malfunction in order to prevent reliance on an erroneous indication.

It is an object of this invention, therefore, to provide an improved means for digitally representing the movements of a physical object.

Another object is to provide a simple and inexpensive analogue to digital converter.

A further object is to provide such an analogue to digital converter which is characterized by very low friction and inertia.

It is a still further object to provide a substantially fail-safe means for converting from analogue to digital representation.

Another object is to adapt a conventional dial indicator for the simultaneous representation of digital information.

In general, these and other objects are accomplished by utilizing the element whose movements are to be indicated as a means for guiding radiant energy to each of a number of stationary coded energy sensitive strips. In a more specific version the dial face of a conventional indicator is made up of a number of concentric light sensitive strips, certain segments of which are masked from the effect of externally supplied energy. The light sensitive strips are arranged to become excited by incident light energy of a given frequency and of an intensity above that of the ambient light. The pointer or needle of the indicator is made of a highly refractive light conductive material and is dimensioned to receive light energy from a stationary source at the center of the dial face and to emit this energy along a radial line on the dial face directly under the pointer. Means are provided to detect the excitation or nonexcitation of each of the concentric rings according to whether this light falls on masked or unmasked segments and to develop a corresponding voltage level on associated terminals. The voltage pattern at the terminals thus provides an indication of the angular rotation of the indicator needle.

Referring now to the figures.

Figure 1:
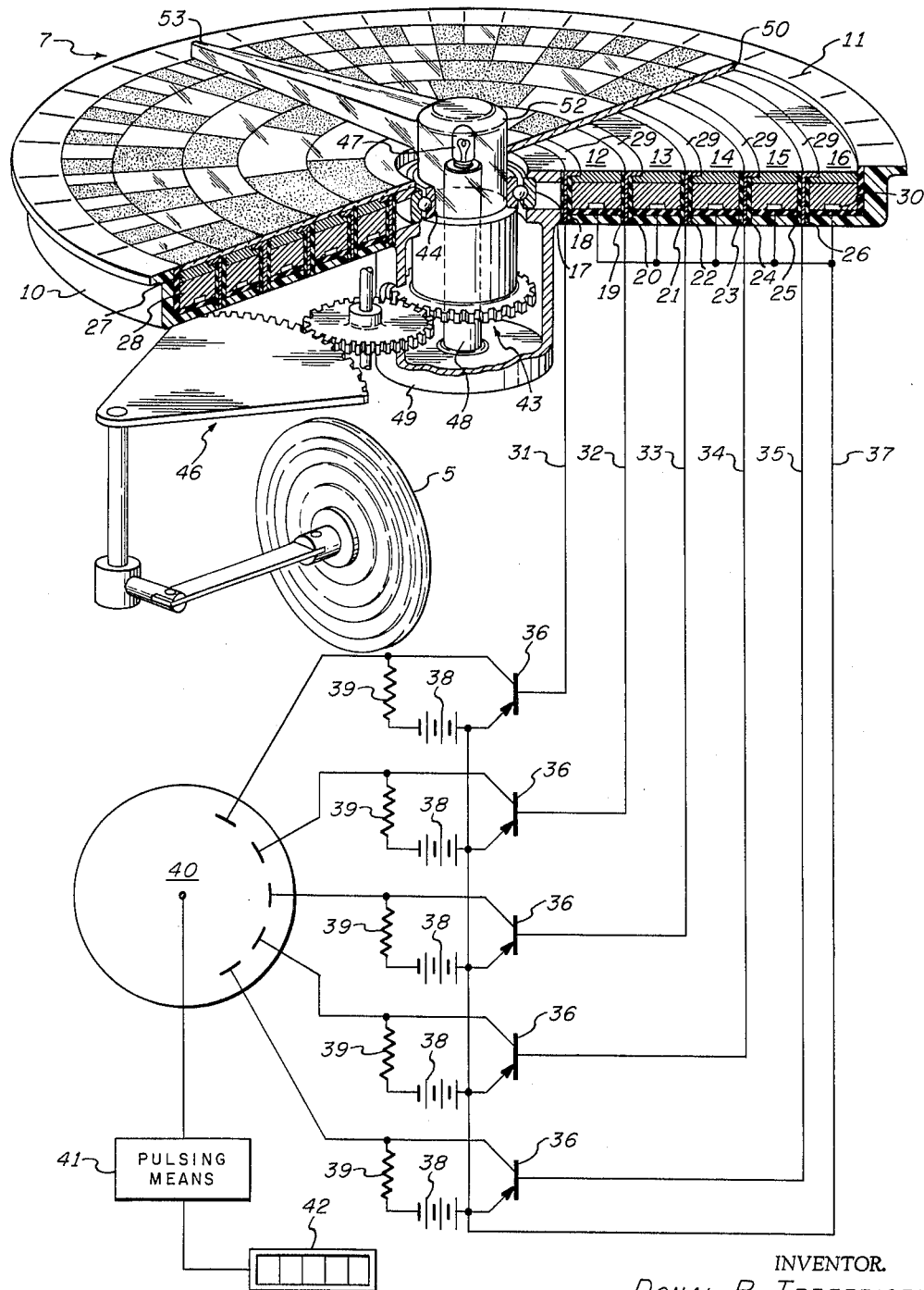
FIG. 1 is a schematic drawing illustrating a preferred embodiment of the invention.

In FIG. 1 the movement of a bellows 5 or similar sensitive element of a standard altimeter or other sensing device is detected and represented on the face of a dial indicator 7. Means are also provided according to the principles of the present invention to produce a digital representation on a counter or other register of this dial position or altimeter output.

The dial indicator 7 is seen to include a housing 10 having graduated markings forming a dial face 11. A light sensitive disc is formed of a plurality of light sensitive strips or rings 12 to 16 which are arranged concentrically within a recess in the housing 10.

Figure 2:
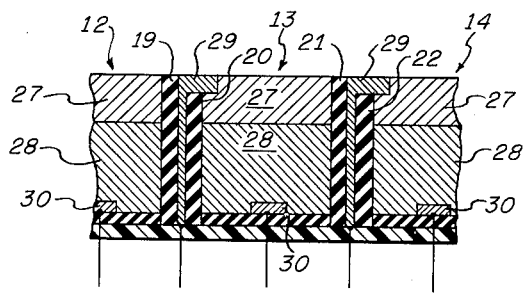
FIG. 2 is an enlarged view of a portion of FIG. 1.

The light sensitive rings are separated from one another by insulating rings 17 to 26 of plastic or other dielectric material. This may be seen more clearly by referring to FIG. 2. Each of the light sensitive rings is made up of an upper layer 27 of a light sensitive material such as cuprous oxide and a lower layer 28 of copper.

The light sensitive rings are masked in certain areas by means of a plastic code disc 50, which lies over the light sensitive disc in the housing 10, flush with the dial face 11. Certain segments of the code disc are transparent to light energy while others are opaque, thus rendering corresponding segments of the various light sensitive rings 13–16 insensitive to changes in externally supplied light intensity. The arrangement of the transparent and opaque segments may correspond to any nonambiguous binary coding pattern such as for example, the conventional or cyclic binary codes. It can be seen that in combination the code disc and the light sensitive disc form an arrangement of individual photocells distributed according to a coded pattern over the face of the instrument.

Terminal strips 29, having L-shaped cross sections, are embedded within each of the insulating rings in the light sensitive disc and act as commutating elements to interconnect all of the upper layer segments in each light sensitive ring. Terminal rings 30 are also provided to interconnect each of the lower layer segments of the light sensitive rings. Individual leads 31 to 35 connect each of the terminal strips 29 to the base electrode of a corresponding transistor amplifier 36. A common lead 37 likewise connects each of the terminal rings 30 to the emitter electrode of each of the transistor amplifiers 36.

A voltage source 38 and a resistor 39 are provided across the emitter-collector terminals of the respective transistors. A multiplexer tube 40 or similar read out device is provided to sense the voltage across the resistor 39 of each transistor amplifier. In the present case the collector electrode of each transistor amplifier is connected to a corresponding electrode in the multiplexer tube and these electrodes are sampled in sequence by means of a pulsing means 41 which transmits the information so obtained to a counter 42 or similar binary register.

It is to be understood that any of a number of well known arrangements may be employed for making use of the digitally coded information. Photocells for example, whose electrical resistance changes with incident light intensity may be substituted for the photovoltaic segments of the light sensitive disc and code disc combination. In this case means to supply a current through the cells as well as means to detect charges in the current as a result of increased or decreased light intensity on the cells would be provided.

The housing 10 supports a tubular hub and gear structure 43 within a bearing assembly 44 at the common center of the light sensitive rings. The hub and gear structure is adapted to be driven by means of a bell crank and gear assembly 46 which in turn is actuated by the bellows 5 of the altimeter.

A lamp 47 or other light source is provided within the tubular hub structure 43. The lamp is mounted in a socket 48 which is maintained stationary relative to the housing 10 by means of a connecting element 49.

A cap 52 having a pointer 53 extending from one side covers the lamp 47 and is connected to the tubular hub structure 43. As the hub rotates it causes the pointer 53 to sweep across the indicator surface.

Figure 3:
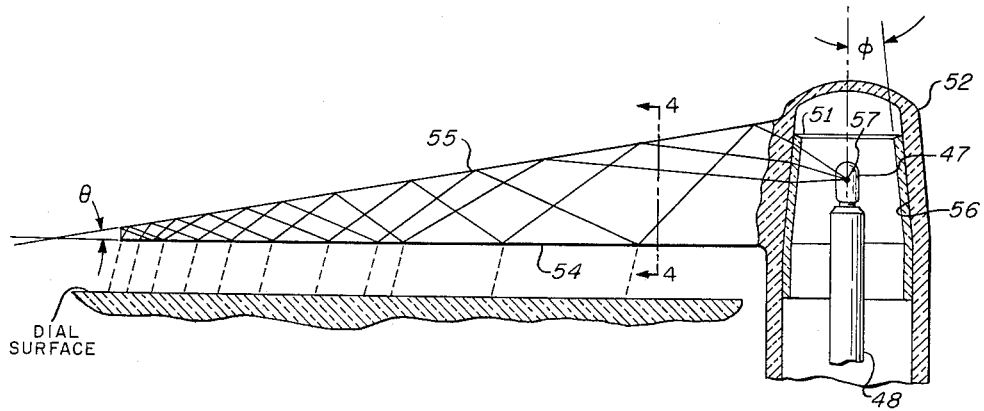
FIG. 3 is a section view taken along line 3—3 of FIG. 1.

The cap and pointer as shown in FIG. 3 are both made of a light conductive material such as for example, Lucite, and are preferably of integral construction. The cap has a lower surface 54 which is parallel with the indicator surface. The upper surface 55, however, is inclined with respect to the lower surface to define a wedge angle $\theta$. The cap 52 is of hollow construction and has an inclined inner surface 56 which forms an angle of incidence $\phi$ with respect to the axis of pointer rotation. The angle of incidence, the wedge angle and the index of refraction of the pointer and cap are chosen such that light energy from the lamp located within cap 52 will propagate through the pointer and emanate in an even stream from its lower surface. The manner in which this occurs is analogous to the well known "wedge lighting effect" which is used extensively in connection with the illumination of indicators and gages. According to this effect, light rays are assumed to originate at a point source, shown in FIG. 2 as 57. These rays impinge upon the inclined surface 56 at various angles and are correspondingly bent to follow different paths within the pointer. Each of these rays strikes the upper surface 55 at an angle greater than the critical angle for the pointer material and therefore is entirely reflected toward the lower surface 54. The ray strikes the lower surface, however, at an angle slightly less than the critical angle and a small percentage of the ray passes through the lower surface 54 toward the code disc 50. The remainder of the ray, meanwhile, is reflected toward the upper surface. Because of the wedge shape of the pointer, the angle at which each ray strikes the lower surface 54 increases for each successive reflection, thus causing a greater percentage of the ray to pass through to the dial surface near the tip of the pointer 53. The net result is an even distribution of light intensity upon the dial face.

Since the critical angle of the Lucite or other light conducting material in the cap and pointer is different for each different wavelength of light, it is preferable that means be provided to restrict the bandwidth of visible light being used. For this reason a red filter 51 is provided within the cap 52. The frequency restricting effect thus produced further serves to reduce the possibility of false indications caused by ambient lighting. If desired the filter could be eliminated merely by employing a red lamp in place of the conventional lamp 47.

Figure 4:
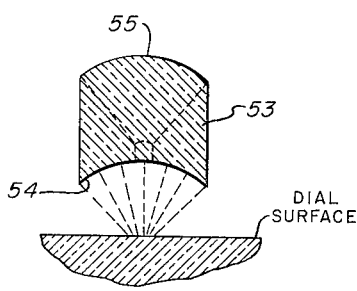
FIG. 4 is a section view taken along line 4—4 of FIG. 3.

Referring now to FIG. 4 it can be seen that the upper and lower surfaces of the pointer 53 are formed according to a concave downward shape. This produces a focusing effect so that the light issues from the lower surface of the pointer in a beam which concentrates in a well defined radial line at the indicator surface. This ensures efficient usage of the light energy supplied by the lamp 47. It also increases the resolution and accuracy of the device. The exact curvature of the upper and lower surfaces necessary to produce this effect may be ascertained according to commonly known optical principles, taking into account the index of refraction of the pointer, its distance from the dial surface and the wavelength of the illuminating light.

During operation of the device the altimeter bellows 5 moves in a linear fashion by an amount proportional to the ambient pressure. This linear movement is converted to rotational motion by means of the bell crank and gear assembly 46 which drives the hub 43 and the pointer 53. The rotational position of the pointer is seen to represent the amount of bellows movement and consequently the altitude or pressure being sensed.

As the pointer moves, the radial beam of light which it directs upon the dial face moves accordingly. Because of the coded arrangement of the light sensitive segments in each of the concentric rings, some rings will be excited by the beam being incident on a light sensitive segment while other rings will remain unexcited by reason of their being masked in that region. As a result a different combination of the light sensitive rings will be excited for each pointer position. These light sensitive rings which are excited by the incident light from the pointer experience a voltage differential between the upper and lower layers of the segment receiving the light. This voltage differential is transferred to their respective terminal strips 29 and terminal rings 30.

The voltage across each terminal strip and its associated terminal ring is amplified in its corresponding transistor amplifier 36 and supplied to a corresponding electrode of the multiplex tube 40. The pulse former 41 causes the tube to be read out sequentially and the information as to pointer position fed into the counter register 42 in serial fashion. Of course where a parallel loading register is provided the information may be supplied directly from the transistor amplifiers.

It should be noted that the pointer operates in a passive manner, serving merely as a light guiding element rather than as an energy source. Because of this, it is possible to make the pointer of very simple and lightweight construction, thereby reducing the dynamic errors associated with high inertia and the static errors associated with friction. Since light is used as the energy to be sensed, friction may be maintained at a value no greater than that in a conventional visual readout type dial indicator.

In order to take full advantage of the inertia reduction afforded by the present invention, the pointer 53, cap 52, and hub and gear assembly 43 may be of a unified construction. It can be seen that in the preferred arrangement shown, the indicator may be read both visually in analog fashion and electronically in digital fashion, either separately or simultaneously with no more difficulty and no more loss of accuracy than single mode of readout type indicators present. Also, it will be appreciated that by slightly roughing the upper surface 55 of the pointer, a small percentage of light may be made to emanate toward an observer, thus enhancing the visual presentation.

While the invention has been described in its preferred embodiments it is to be understood that the words which have been used are words of description rather than of limitation and that changes within the purview of the appended claims may be made without departing from the true scope and spirit of the invention in its broader aspects.

What is claimed is:
1. An indicating apparatus comprising
   (a) a plurality of segments sensitive to radiant energy to change their respective electrical characteristics, said segments being distributed in parallel strips according to a binary coded pattern,
   (b) a source of radiant energy,
   (c) a movable element constrained to movement in a direction parallel to said strips, said element and said source continually along the travel of said element being adapted to receive and to direct radiant energy at a point on each strip coinciding to the position of said movable element,
   (d) and a pair of conductors for each strip, said conductors in each pair of conductors being arranged so that each segment of its respective strip connects between them, whereby changes in the electrical characteristics of said segments may appear as electrical signals.
2. An indicating apparatus comprising
   (a) a plurality of segments sensitive to radiant energy to change their respective electrical characteristics, said segments being distributed in parallel strips according to a binary coded pattern,
   (b) a stationary source of radiant energy,
   (c) a movable element constrained to movement in a direction parallel to said strips, said movable element along the length of its travel being adapted to receive and conduct radiant energy from said source and to project said radiant energy at a point on each strip coincident with the position of said movable element,
   (d) and a pair of conductors for each strip, said conductors in each pair of conductors being arranged so that each segment of its respective strip connects between them, whereby changes in the electrical characteristics of said segments may appear as electrical signals.
3. An indicating apparatus comprising
   (a) a plurality of segments sensitive to light to change their respective electrical characteristics, said segments being arranged in parallel strips according to a binary coded pattern,
   (b) a fixed source of light,
   (c) a highly refractive light conductive element extending transversely across each of said strips and constrained to movement in a direction parallel to said strips, said light conductive element continually along its path of travel being adapted to receive light from said source and to direct said light in a line across said strips,
   (d) and a pair of conductors for each strip, said conductors in each pair of conductors being arranged so that each segment of its respective strip connects between them, whereby changes in the electrical characteristics of said segments may appear as electrical signals.
4. Apparatus for indicating the movements of a physical object said apparatus comprising
   (a) a plurality of fixed photoelectric strips arranged parallel to each other and masked in various regions according to a coded pattern,
   (b) a fixed source of light,
   (c) a light conductive member arranged to move in a direction parallel to said strips, said light conductive member along its course of travel being adapted to receive, direct and focus light from said fixed source upon each strip at a point commensurate with its position,
   (d) and a pair of conductors for each strip, said conductors in each pair of conductors being arranged so that each segment of its respective strip connects between them, whereby changes in the electrical characteristics of said segments may appear as electrical signals.
5. Apparatus for indicating the movements of a physical element said apparatus comprising
   (a) a plurality of photoelectric segments distributed in concentric coplanar rings according to a binary coded pattern,
   (b) a source of light fixed in the vicinity of said coplanar rings along their common axis,
   (c) a pointer adapted to rotate about said common axis in a plane parallel and near to said rings, said pointer receiving said light and having a high index of refraction and dimensioned to direct light from said source onto said rings in a radial line coinciding with the position of said pointer,
   (d) and a pair of conductors for each ring, said conductors in each pair of conductors being arranged so that each segment of its respective ring connects between them, whereby changes in the electrical characteristics of said segments may appear as electrical signals.
6. An indicating apparatus comprising
   (a) a plurality of rings of a photoelectric material arranged concentrically and in a common plane about an axis, said rings having segments rendered insensitive to the effects of incident light energy, said segments being distributed according to a binary code,
   (b) a source of light located along said axis,
   (c) a light conductive pointer arranged to rotate about said source of light in a plane perpendicular to said axis and near said rings, said light conductive pointer having a refractive index differing from air and being dimensioned to direct and focus a beam of light from said source onto said concentric rings in a radial line coinciding with the position of said pointer,
   (d) and a pair of conductors for each ring, said conductors in each pair of conductors being arranged so that each segment of its respective ring connects between them, whereby changes in the electrical characteristics of said segments may appear as electrical signals.
7. The apparatus described in claim 6 wherein said pointer has a first surface parallel to and facing said rings, an opposite surface inclined with respect to said first surface to define wedge shaped longitudinal section of decreasing thickness away from said source and a further surface at the base of said wedge facing said source and inclined with respect to said axis.
8. The apparatus described in claim 7 wherein said pointer has a lens shaped transverse cross section capable of focusing light which emanates from said lower surface into a sharply defined region on said rings.
9. A digitally readable dial indicator comprising
   (a) a fixed housing,
   (b) a plurality of ring shaped photovoltaic strips arranged concentrically in a common plane within said housing,
   (c) insulating means for mutually isolating each of said strips,
   (d) a pair of conductors for each strip, said conductors in each pair of conductors being arranged so that each segment of its respective strip connects between them, whereby changes in the electrical characteristics of said segments may appear as electrical signals,
   (e) electrically conductive commutating means for connecting each point along the length of each strip to its associated terminal,
   (f) a disc having alternate light transparent and opaque regions covering certain segments of each of said strips according to a binary code,
   (g) a light conductive pointer adapted to rotate in a plane parallel to and coaxial with said common plane in response to movements to be indicated, said light conductive pointer being capable of absorbing incident light in the vicinity of its axis of rotation, and to emit said light in a sheet shaped beam from its entire length onto said strips, (h) and a source of light fixed with respect to said housing along said axis of rotation in the vicinity of said light conductive pointer.

References Cited by the Examiner

UNITED STATES PATENTS

| | | | |
|---|---|---|---|
| 2,436,178 | 2/1948 | Rajchman | 340—347 |
| 2,659,563 | 11/1953 | Saxe | 250—227 X |
| 2,910,684 | 10/1959 | Jones | 340—347 |
| 3,041,599 | 6/1962 | Beaudette | 340—347 |
| 3,046,540 | 7/1962 | Litz et al. | 250—219 X |

RALPH G. NILSON, *Primary Examiner.*

WALTER STOLWEIN, *Examiner.*